United States Patent
Larsson et al.

(10) Patent No.: US 7,571,382 B2
(45) Date of Patent: Aug. 4, 2009

(54) PARTIAL RETRIEVAL OF IMAGES IN THE COMPRESSED DOMAIN

(75) Inventors: Mathias Larsson, Saltsjöbaden (SE); Charilaos Christopoulos, Sollentuna (SE); Magnus Jändel, Upplands Väsby (SE); Diego Santa Cruz, Versoix (CH); Touradj Ebrahmi, Pully (CH)

(73) Assignee: Telefonaktiebolaget LM Ericsson, Stockholm (SE)

( * ) Notice: Subject to any disclaimer, the term of this patent is extended or adjusted under 35 U.S.C. 154(b) by 1044 days.

(21) Appl. No.: 09/418,323

(22) Filed: Oct. 14, 1999

(65) Prior Publication Data

US 2003/0110299 A1 Jun. 12, 2003

(30) Foreign Application Priority Data

Oct. 21, 1998 (SE) .................................. 9803593

(51) Int. Cl.
*G06F 17/00* (2006.01)
*G06F 15/16* (2006.01)

(52) U.S. Cl. .................... 715/249; 715/248; 715/250; 715/272; 709/247

(58) Field of Classification Search ................. 709/247, 709/219, 203; 707/101; 714/18; 382/232, 382/248, 250, 251, 254, 276, 283, 233, 243; 715/248, 249, 250, 272; 380/217
See application file for complete search history.

(56) References Cited

U.S. PATENT DOCUMENTS 5,253,055 A * 10/1993 Civanlar et al. ........ 375/240.24

5,327,248 A * 7/1994 Miller et al. ................. 382/233

(Continued)

FOREIGN PATENT DOCUMENTS

DE 38 20 038 A1 12/1989

(Continued)

OTHER PUBLICATIONS

Pete Santago and Sarah A. Rajala, "New Technique for Combined Pixel and Frequency Domain Image Sequence Coding", Military Communications Conference, 1985. MILCOM 1985. IEEE, vol. 3, Oct. 20-23, 1985, pp. 624-627.*

(Continued)

*Primary Examiner*—Laurie Ries
*Assistant Examiner*—Chau Nguyen
(74) *Attorney, Agent, or Firm*—Nixon & Vanderhye P.C.

(57) ABSTRACT

In a method and a system for retrieving images in a client-server system, images are stored as a set of independently decodable units (CU's) on the server. A client issues a series of requests for image information. Each request contain a request number, information on what image information the client wants to see next and information on what image information the client had received at the time when the request was issued. The server does not have to store any state information (e.g. previous requests). On receiving a request, the server sends a restart marker, a confirmation of the request number and incremental image information corresponding to the request. The use of the method and the system as described herein will result in that no decoding of the whole bit stream will be required in the server. This will save a lot of time at the sender side (server side), since it not needs to a full decoding of the stream.

13 Claims, 6 Drawing Sheets

U.S. PATENT DOCUMENTS

| | | | |
|---|---|---|---|
| 5,444,550 A | 8/1995 | Enokida et al. | |
| 5,511,156 A | 4/1996 | Nagasaka | |
| 5,691,820 A | 11/1997 | Komatsu | |
| 5,764,235 A | 6/1998 | Hunt et al. | |
| 5,838,927 A * | 11/1998 | Gillon et al. | 709/247 |
| 5,867,652 A * | 2/1999 | Hurvig | 709/203 |
| 5,966,465 A * | 10/1999 | Keith et al. | 382/232 |
| 5,991,816 A * | 11/1999 | Percival et al. | 709/247 |
| 6,006,231 A * | 12/1999 | Popa | 707/101 |
| 6,049,892 A * | 4/2000 | Casagrande et al. | 714/18 |
| 6,182,114 B1 * | 1/2001 | Yap et al. | 709/203 |
| 6,182,127 B1 * | 1/2001 | Cronin et al. | 709/219 |
| 6,256,415 B1 * | 7/2001 | Ratnakar | 382/232 |
| 6,259,735 B1 * | 7/2001 | Aono et al. | 375/240.11 |
| 6,442,298 B1 * | 8/2002 | Nixon | 382/248 |
| 6,496,607 B1 * | 12/2002 | Krishnamurthy et al. | 382/282 |
| 6,532,307 B1 * | 3/2003 | Sato | 382/240 |
| 6,546,143 B1 * | 4/2003 | Taubman et al. | 382/240 |
| 6,804,405 B2 * | 10/2004 | Christopoulos et al. | 382/243 |
| 2001/0048768 A1 * | 12/2001 | Tan | 382/233 |

FOREIGN PATENT DOCUMENTS

| | | |
|---|---|---|
| EP | 0 346 637 | 12/1989 |
| EP | 0 529 864 | 3/1993 |
| WO | WO 98/50838 | 11/1998 |

OTHER PUBLICATIONS

European Office Action mailed Dec. 28, 2005.

"Visualization of Large Terrains in Resource-Limited Computing Environments", Rabinovich et al., 1997 IEEE, pp. 95-102.

"Visual Realism and Interactivity for the Internet", Blumberg et al., 1997 IEEE, pp. 269-273.

"Report of the Arbitrary Reordering of Bitplanes for the Scalable/Progressive Coding Core Experiments", Jin et al., ISO/IEC JTC1/SC29/WG1 N846, No. 9, Jun. 25-26, 1998 (7pgs).

* cited by examiner

Client-Server process

Client request 1) `<request number> <Image data acknowledge> <Image data request 1>` =
`<request number> <Image data acknowledge> <number>`

Server response 1) `<restart marker> <request number> <Image data 1>` =
`<restart marker> <request number> <CU stream 2>` =
`<header> <Length CU1> <CU1> <Length CU2> <CU2>...`
`<Length CUN><CUN>`

Client request 2) `<request number> <Image data acknowledge> <Image data request 3>` =
`<restart marker> <request number> <number> <ROI number> <ROI description>`

Server response 2) `<restart marker> <request number> <Image data 3>` =
`<restart marker> <request number> <CU stream>` =
`[header] <Length CUn> <CUn> <Length CUn+1>`
`<CUn+1>... <Length CUN><CUN>`

...

Client request N) stop transmission (not needed if TCP is used)

Note that the `[header]` field is not always needed.

Fig. 5

Client-Server process

Client request 1) `<request number> <Image data acknowledge> <Image data request 1>` =
`<request number> <Image data acknowledge> <number>`

Server response 1) `<restart marker> <request number> <Image data 1>` =
`<restart marker> <request number> <CU stream 3>` =
`<header> <Tag 1> <CU1> <Tag2> <CU2>` ... `<Tag N><CUN>`

Client request 2) `<request number> <Image data acknowledge> <Image data request 3>` =
`<restart marker> <request number> <number> <ROI number> <ROI description>`

Server response 2) `<restart marker> <request number> <Image data 3>` =
`<restart marker> <request number> <CU stream>` =
`[header] <Tag n> <CUn> <Tagn+1> <CUn+1>` ... `<Tag N><CUN>`

...

Client request N) stop transmission (not needed if TCP is used)

Note that the `[header]` field is not always needed.

Fig. 6

Client-Server process

Client request 1) `<request number> <Image data acknowledge> <Image data request 1>` = `<request number> <Image data acknowledge> <number>`

Server response 1) `<restart marker> <request number> <Image data 1>` = `<restart marker> <request number> <CU stream 4>` = `<header> <CU1> <Tag1> <CU2> <Tag 2>`... `<CUN> <Tag N>`

Client request 2) `<request number> <Image data acknowledge> <Image data request 3>` = `<restart marker> <request number> <number> <ROI number> <ROI description>`

Server response 2) `<restart marker> <request number> <Image data 3>` = `<restart marker> <request number> <CU stream>` = `[header] <CUn> <Tagn> <CUn+1> <Tag n+1>`... `<CUN> <Tag N>`

...

Client request N) stop transmission (not needed if TCP is used)

Note that the `[header]` field is not always needed.

Fig. 7

Client-Server process

801 — Client request 1) `<request number> <Image data acknowledge> <Image data request 5> = <request number> <Image data acknowledge> <CU sequence>`

803 — Server response 1) `<restart marker> <request number> <Image data 1> = <restart marker> <request number> <CU stream 3> = <header> <Tag 1> <CU1> <Tag2> <CU2> ... <Tag N><CUN>`

805 — Client request 2) `<request number> <Image data acknowledge> <Image data request 5> = <restart marker> <request number> <CU sequence>`

807 — Server response 2) `<restart marker> <request number> <Image data 3> = <restart marker> <request number> <CU stream> = [header] <Tag m> <CUm> <Tagn> <CUn> ... <Tag x><CUx>`

...

Client request N) stop transmission (not needed if TCP is used)

Note that the `[header]` field is not always needed, and that the CU not needs to be in order.

Fig. 8

PARTIAL RETRIEVAL OF IMAGES IN THE COMPRESSED DOMAIN

TECHNICAL FIELD

The present invention relates to a method and a system for transmitting images between a client and a server. The method and the system are particularly well suited for transmission of parts of images stored in a server.

BACKGROUND OF THE INVENTION AND PRIOR ART

Digital images can be stored on servers and distributed over a telecommunication network. Images can also be stored on physical media using for example a CD-ROM. If the image is large it might take some time to transmit the image. In order to speed up the transmission the client might select a region of the image that are more vital and then only receive the region. This is known as Region of Interest (ROI) coding.

In today's client-server systems, if a client wants to access an image from a server, a connection is established between the user program at the client side and the server. The user program then sends a request to get the desired image. The server reacts by fetching the file and starts the transmission. The user program can at any time send a new request to the server, e.g., a request for parts of a file. When the transmission is finished the connection is closed. Such a system is described in Fielding, et al, Hypertext Transfer Protocol—HTTP/1.1 rev 05, HTTP Working Group, INTERNET-DRAFT, Sep. 11, 1998 (Work in progress).

However, there is a problem with most of the still image compression techniques, like e.g. JPEG, in that they produce a bit stream being one inseparable coding unit. Thus, if a Region of Interest is selected the lack of independently decodable units forces the server to perform a complete decoding followed by a new encoding of the whole bit stream. Depending on the server software it sometimes even has to re-load the image from the storage media. The drawback with this is that a time consuming and computational complex scheme is required, which will put high demands on the computational power of the server.

Furthermore, in the emerging still image standard JPEG2000 independent entropy coding of so called coding units (CU) is used. A coding unit can for example be, a subband in the transform domain, in the case of i.e. wavelet transform), a part of a subband, such as bit plane or block of certain size (example 16×16), or a bit plane for a region within a subband.

SUMMARY

It is an object of the present invention to overcome the problems as outlined above and in particular to reduce the amount of processing and encoding in a server when a client requests an ROI or a part of the image.

This object and others are obtained by storing images as a set of independently decodable units (CU's) on a server. When a client requests a certain part of the image only information from the CUs that have not already been transmitted are then re-encoded, which saves a lot of processing time in the server.

For example, a client is issuing a series of requests for image information. Each request contain a request number, information on what image information the client wants to see next and information on what image information the client had received at the time when the request was issued. The server does not have to store any state information (e.g. previous requests). On receiving a request, the server sends a restart marker, a confirmation of the request number and incremental image information corresponding to the request.

The use of the method and the system as described herein will result in that no decoding of the whole bit stream will be required in the server. This will save a lot of time at the sender side (server side), since it not needs to perform a full decoding of the stream.

BRIEF DESCRIPTION OF THE DRAWINGS

The present invention will now be described in more detail and with reference to the accompanying drawings, in which.

DETAILED DESCRIPTION

Figure 1:
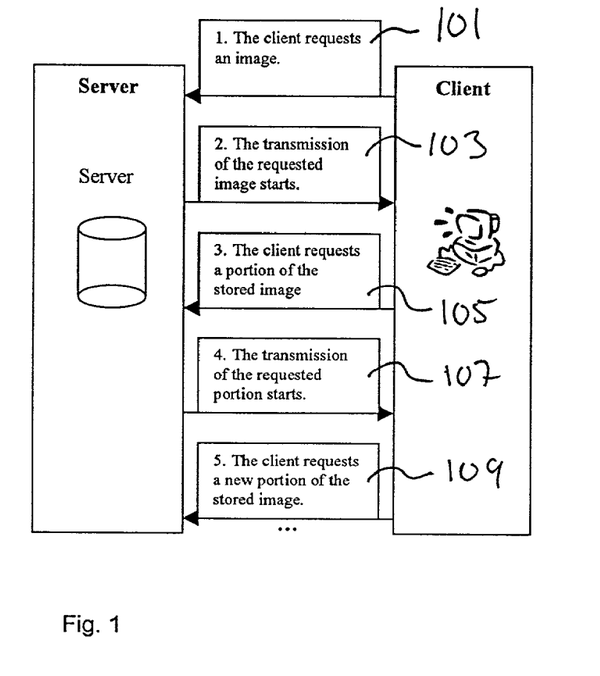
FIG. 1 shows the basic steps carried out in a client-server process.

In FIG. 1, a basic interaction between a client and a server is shown. Thus first the client requests an image, step 101. Next in a step 103, the server starts to transmit the image to the client. The client then, at some time during transmission requests a portion of the image, which is currently being transmitted, step 105. The server then, in response to the request in step 105, starts to transmit the requested portion, step 107. The client may also request additional portions of the image at any time as indicated in step 109. The transmission can be interrupted at any time at a lower protocol level, such as TCP or HTTP.

In the following description and on the corresponding drawings the following definitions, syntax and notation is used:

A Coding Unit (CU) is a part of a bit stream that is independently decodable. Thus, it is possible to decode a certain part of the bit stream without having to decode the whole stream.

A TAG or re-sync mark is a combination of bits that can not be generated from the entropy encoder.

Syntax Elements in the Client-Server Process

Several detailed instances of a basic client server process are described below. They correspond to various specific formats of the syntax elements in the Client-Server process.

<Image data request> can have the following formats:
    <Image data request 1>=send the first <number> subbands
    <Image data request 2>=send the first <number> bit planes
    <Image data request 3>=send the first <number> subbands of the ROI <ROI number> <ROI description>
    <Image data request 4>=send the first <number> bitplanes of the ROI <ROI number> <ROI description>
    <Image data request 5>=send <CU sequence> (describing what CU's are requested)

<Image data acknowledge> can have the following formats:
<Image data acknowledge 1>=<Image data acknowledge marker> bits/bytes/CUs received <number>
<Image data acknowledge 2>=<Image data acknowledge marker> CUs received <number> <CU n1> <CU n2> . . . <CU nn>, where <CU n> is the number assigned to a received CU Version 1 is used with a re-sending and packet ordering transmission protocol such as TCP. Version 2 is used with a connectionless best-effort transmission protocol such as UDP.

<Image data > can have the following formats:
<Image data 1>=<CU stream> corresponding to the first <number> of remaining subbands
<Image data 2>=<CU stream> corresponding to the first <number> of remaining bit planes
<Image data 3>=<CU stream> corresponding to the first <number> remaining subbands of the ROI <ROI number>
<Image data 4>=<CU stream> corresponding to the first remaining <number> bit planes of the ROI <ROI number>
<Image data 5>=<CU stream> corresponding to the CU's specified in <Image data request 5>

Several different formats of <CU stream> are possible:
<CU stream 1>=<header> <Length CU1> <Length CU2> . . . <Length CUN> <CU1> <CU2> . . . <CUN>
<CU stream 2>=<header> <Length CU1> <CU1> <Length CU2> <CU2> . . . <Length CUN><CUN>
<CU stream 3>=<header> <Tag 1> <CU1<Tag2> CU2> . . . <Tag N><CUN>
<CU stream 4>=<header> <CU1> <Tag1> <CU2> <Tag 2> . . . <CUN> <Tag N>

The image header is not required is it already has been received by the client.

<Image transcoding header> contains a description of the transcoding operations that was performed on the original image in order to produce the transcoded image. The client use this information to map CU's from the original image to the transcoded image and to map CU's from the transcoded image to the original image.

<image posting notification> is used for telling the client that the transcoded image is stored at the server. It gives the URL of the transcoded image. A time-out can optionally be including indicated that the image will be saved only for a specified time.

Figure 2:
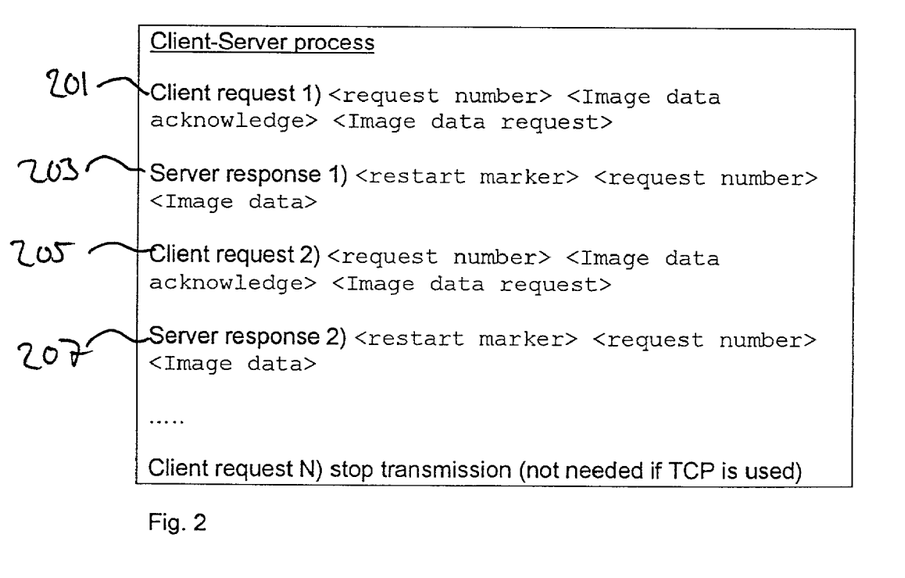
FIG. 2 shows the steps carried out in a client-server process according to a first embodiment.

In FIG. 2 a first embodiment of the present invention is shown. Thus, in this case the client wants to access parts of the stored image. This could be certain bit planes, subbands or pre-stored Regions of Interest. In this case the server do not use any special functions to respond to the request except the ones used in the communication protocol (e.g. HTTP). A process is for this is shown in FIG. 2.

Step 201, the client sends and requests for a stored image. The image is stored as a compressed bit stream and in a format comprising independently coded coding units (CU).

Step 203, the server responds and starts the transmission.

Step 205, the client decides that a part of the image is more important. The Client gets the information of where it is stored from the image header, and sends a request to the Server for the desired part. The part can be an ROI or image data, which increases the quality of the whole image.

Step 207, the Server may now send a re-start mark and starts the transmission of the wanted CU's.

The re-start marker functionality can also be provided by a lower protocol in the stack, e.g. TCP or HTTP. The re-start marker can optionally be excluded if it can be derived from information in the lower protocol levels.

Figure 3:
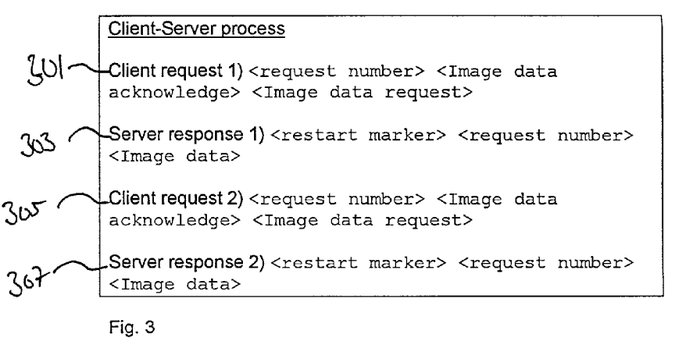
FIG. 3 shows the steps carried out in a client-server process according to a second embodiment.

In FIG. 3 another type of client server process is shown. In the process shown in FIG. 3, no advanced processing is performed at the server side. In the example described in conjunction with FIG. 3, a Client starts receiving an image and then in the middle of the transmission decides that some part of the image is more vital and only want that part to be transmitted. This could be a number of bit planes, subbands or Regions of Interest. It should be noted that in this case the image could be stored with a Region of Interest (ROI) but the user wants to select another ROI.

In such a case the server has to use some additional functions for finding the requested parts of the compressed image. The interaction between the Client and the Server and the operation at each sides can then be as follows, acknowledgement messages and similar massages are not shown for clarity reasons. The can for example use IP, TCP/UDP, HTTP or similar protocols for such messages.

Step 301, a client sends and requests for a stored image. The image is stored as a compressed bit stream and in a format having independently coded coding units (CU).

Step 303, the Server responds and starts the transmission

Step 305, the Client decides that a part of the image is more important and if a Region of Interest is selected it also sends the shape of the selected region and some other information needed. This could be, e.g., the chronological number of the request, the number of CU's or bytes received, marked with (*) in FIG. 4. At this point the Client has created a mask in the transform domain, for example using the method described in Charilaos Christopoulos (editor), JPEG 2000 Verification Model Version 1.2, ISO/IEC JTC1/SC29/WG1 N982, Aug. 14, 1998, that selects the coefficients needed for the server to decide what CU's are needed from the Server.

Step 307, the Server gets the request. The server uses information in the bit stream, such as TAGS, in order to find the desired CU's. The server now sends a re-start mark and if needed the lengths of the remaining CU's. It then starts the transmission of the requested CU's.

In the following the situation where a Client starts receiving an image and then in the middle of the transmission decides that some part of the image is more vital and only want that part to be transmitted is dealt with. This is also known as selection of Region of Interest. It should be noted that in this case the image could be stored with a Region of Interest (ROI) but the user wants to select another ROI. In the example below the JPEG2000 progressive-by-resolution (PBR) scheme is used. A similar method can however be applied in progressive-by-accuracy (PBA) schemes, as is described in Charilaos Christopoulos (editor), JPEG 2000 Verification Model Version 1.2, ISO/IEC JTC1/SC29/WG1 N982, Aug. 14, 1998.

Figure 4:
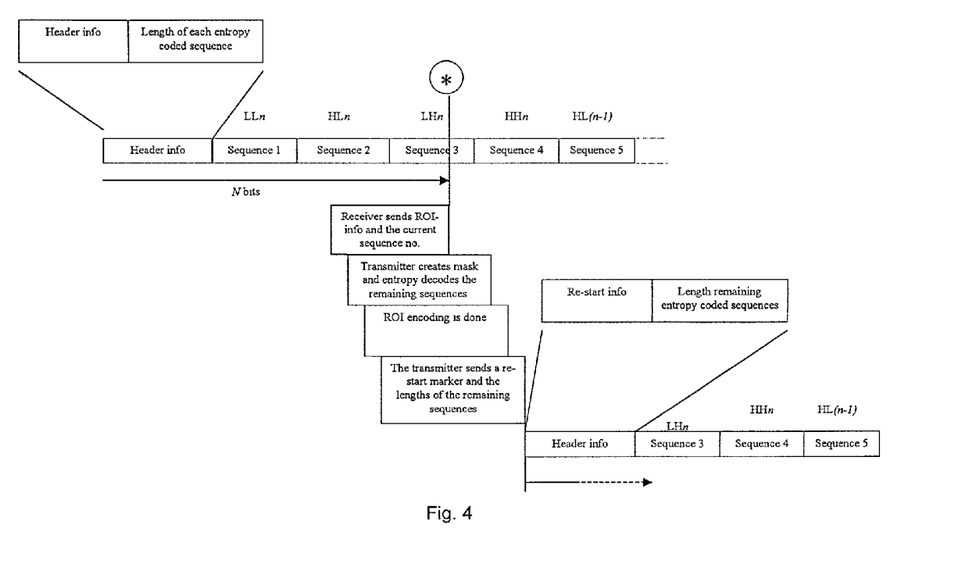
FIG. 4 shows the steps carried out in a client-server process according to a third embodiment.

In FIG. 4, the progressive-by-resolution scheme in JPEG2000, is shown. In the PBR mode of JPEG2000 each subband can, in a simplified way, be viewed as a coding unit, CU, since the whole subband is independently entropy coded. This is the case if the so called non-adaptive mode is used, since in this case a subband is the same thing as a sequence. This will make it possible to entropy decode any subband independently if the Client knows where to find it in the bit stream. In the very basic mode of JPEG2000 this is supported by an array, that is stored in the image header, containing the lengths of each CU in bits/bytes. Thus it is possible for the Client to parse the bit stream since it knows the length of each entropy-coded subband.

The client sends a request to a server and requesting a stored image. The image is stored as a compressed bit stream.

The server gets the bit stream and starts the transmission. In a preferred embodiment, the interaction between the Client and the Server and the operation at each sides is as follows, acknowledgement messages and similar messages are left out for reasons of clarity.

First the client sends and requests for a stored image. The image is stored as a compressed bit stream and in a CU format.

The Server then responds and starts the transmission

At some point during the transmission, the Client decides that a part of the image is more important and sends the shape of the selected region and some other information needed. This can, e.g., be the chronological number of the request, the number of CU's or bytes received, marked with (*) in FIG. 4.

The Server then gets the request for the ROI and performs an entropy decoding for the CU's that has not been sent. In this case it is the subbands that not have been sent yet. The entropy decoding will give the quantized transform coefficients. The server creates a mask in the transform domain. Then the server can select the coefficients that are needed for the Region of Interest, for example using the method described in Charilaos Christopoulos (editor), JPEG 2000 Verification Model Version 1.2, ISO/IEC JTC1/SC29/WG1 N982, Aug. 14, 1998. Thus, by using the mask the Server selects which coefficients are needed in each of the remaining subbands. The quantized coefficients belonging to the Region of Interest are then entropy encoded subband wise. Thus, the same CU structure is kept. The Server may now send a re-start mark and the lengths of the CU's to be sent and starts the transmission of the CU's.

The Client gets the response from the server describing what type of transcoding that have been used. The Client then creates the desired mask in the transform domain, for example using the method described in Charilaos Christopoulos (editor), JPEG 2000 Verification Model Version 1.2, ISO/IEC JTC1/SC29/WG1 N982, Aug. 14, 1998 that selects the coefficients needed for the response from the Server.

From the Client point of view the result will be that the Region of Interest will have full resolution, while the background will have a reduced resolution (which could improve in later stages if the method described above using the shifting is used). The amount of reduction of course depends on when the Region of Interest request was done.

If the request for the Region of Interest hits in the middle of a CU, which will be the most probable case, there are two ways of proceeding. Either the CU where the request hit is re-transmitted, or the transmission of the CU is completed and then the re-coding starts.

In the case of the progressive-by-accuracy mode in JPEG2000 the same idea as in the previous example can be used without any major changes. In this case a CU is a bit plane. Thus, the bit stream is ordered by accuracy. First the highest bit plane is transmitted and then the second highest and so on.

The interaction between the Client and the Server and the operation at each sides are the following, where acknowledgement messages and similar messages are left out.

First the client sends and requests for a stored image. The image is stored as a compressed bit stream and in CU format.

The Server responds and starts the transmission.

The Client decides that a part of the image is more important and sends the shape of the selected region and some other information needed. This could, e.g., be the chronological number of the request, the number of CU's or bytes received, marked with (*) in FIG. 4. At this point the Client has created a mask in the transform domain, for example using the method described in Charilaos Christopoulos (editor), JPEG 2000 Verification Model Version 1.2, ISO/IEC JTC1/SC29/WG1 N982, Aug. 14, 1998, that selects the coefficients needed for the response from the Server.

The Server gets the request for the ROI and performs an entropy decoding for the CU's that has not been sent. In this case it is the bit planes that not have been sent yet. The entropy decoding will give the remaining parts of the quantized transform coefficients. The server creates a mask in the transform domain. Then the server can select the coefficients that are needed for the Region of Interest, for example using the method described in Charilaos Christopoulos (editor), JPEG 2000 Verification Model Version 1.2, ISO/IEC JTC1/SC29/WG1 N982, Aug. 14, 1998. Thus, by using the mask the Server selects which coefficients are needed in each of the bit planes. The remaining parts of the quantized coefficients belonging to the Region of Interest are then entropy encoded bit plane wise. Thus, the same CU structure is kept. The Server can now send a re-start mark and the lengths of the CU's to be sent and starts the transmission of the CU's.

Instead of having a reduction of the resolution in the background, as in the previous example, the accuracy of the pixels not belonging to the Region of Interest is reduced. This is done by simply skipping the remaining bit planes for bit planes belonging to the background.

On receiving a request, the server transcodes the original image. The transcoded image is either sent to an output buffer, processes C1 and C2 below or posted as a new image, process C3 below. A new client request will always refer to a posted image either the original image as in C1 and C2, see below, or the posted transcoded image as in C3, see below. The client is responsible for transforming between image formats so that received image information referring to the original image can be reused in the client's copy of the transcoded image. Successful reuse is reported to the server in <Image data acknowledge> messages.

Client-Server Process C1 (Optimized for Download Speed)

This process could start without any previous transfer of image information. A client-server process according to cases described above in conjunction with FIG. 2 or 3, might, however, have occurred. Some of the CUs of the original image might have been transferred to the client during this process. The client knows about this previous activity but the server does not store any such state information.

Client request 1) <request number> <Image data acknowledge> <Image data request>

Server response 1) <restart marker> <request number> <image transcoding header> <image header> <CU stream> (the header of the transcoded image is sent)

If the client does not understand the new format, it can interrupt the stream at the TCP level. A new set of client-server exchanges can continue. They will always refer to the original image since the transcoded image usually is not kept by the server. If a new request according to case occurs, the server will then usually repeat the transcoding operation. The server might decide to save a cached copy of the transcoded image but this cannot be assumed by the client.

Client-Server Process 2 (Optimized for Low Bandwidth)

This process can also start without any previous transfer of image information. A client-server process according to cases described above in conjunction with FIG. 2 or 3, might, however, have occurred. Some of the CUs of the original image might have been transferred to the client during this process. The client knows about this previous activity but the server does not store any such state information.

Client request 1) <request number> <Image data acknowledge> <Image data request>

Server response 1) <restart marker> <request number> <image transcoding header> <image header> (the server has only calculated the header of the transcoded image. A complete transcoding has not been performed)

Client request 2) <request number> <Image header acknowledge> <Image data acknowledge> <Image data request> (The client confirms that it can handle the transcoded format. The request is repeated since the server does not save the old request)

Server response 2) <restart marker> <request number> <CU stream> (the server performs a complete transcoding and sends the body of the image file to the output buffer)

Client-Server Process C3 (a Transcoded Image is Posted by the Server)

This process could start without any previous transfer of image information. A client-server process according to cases described above in conjunction to the FIG. 2 or 3 might, however, have occurred. Some of the CUs of the original image might have been transferred to the client during this process. The client knows about this previous activity but the server does not store any such state information.

Client request 1) <request number> <Image data acknowledge> <Image data request>

Server response 1) <restart marker> <request number> <image transcoding header> <image header> <image posting notification>

Client request 2) (the client is now addressing the posted transcoded image at the http protocol level) <request number> <Image header acknowledge> <Image data acknowledge> <Image data request>

(The client is responsible for transforming CUs from the original image to the format of the transcoded image. The result of these operations is put in the <Image data acknowledge>)

Server response 2) <restart marker> <request number> <CU stream>

A new set of client-server exchanges can continue. They can refer to the original or transcoded image according to decisions by the client.

It should be noted that in some situations the number of received CU's or bits/bytes is not needed. This is the case if the Client continues to receive image data after the request(s) has been sent. The Server sends the re-start mark and maybe some other info in order to inform the Client that from now on the requested bit plane, subband or Region of Interest is coming.

Below additional examples of interactive selection of Regions of Interest during transmission from bit streams when the stream does not contain the desired Region of Interest are described. The examples illustrates the different bit stream formats <CU stream 1>-<CU stream 4>

Above, in conjunction with FIG. 4, the PBR-mode of the JPEG2000 coder is described. A modification of the scheme described above would be to send the length of the CU together with the data. Thus, when the Server gets the request for the ROI and performs an entropy decoding for the CU's that has not been sent. Instead of sending a re-start mark and the lengths of the CU's to be sent and starts the transmission of the CU's, the Server can now send a re-start mark and the length of the following CU.

Figure 5:
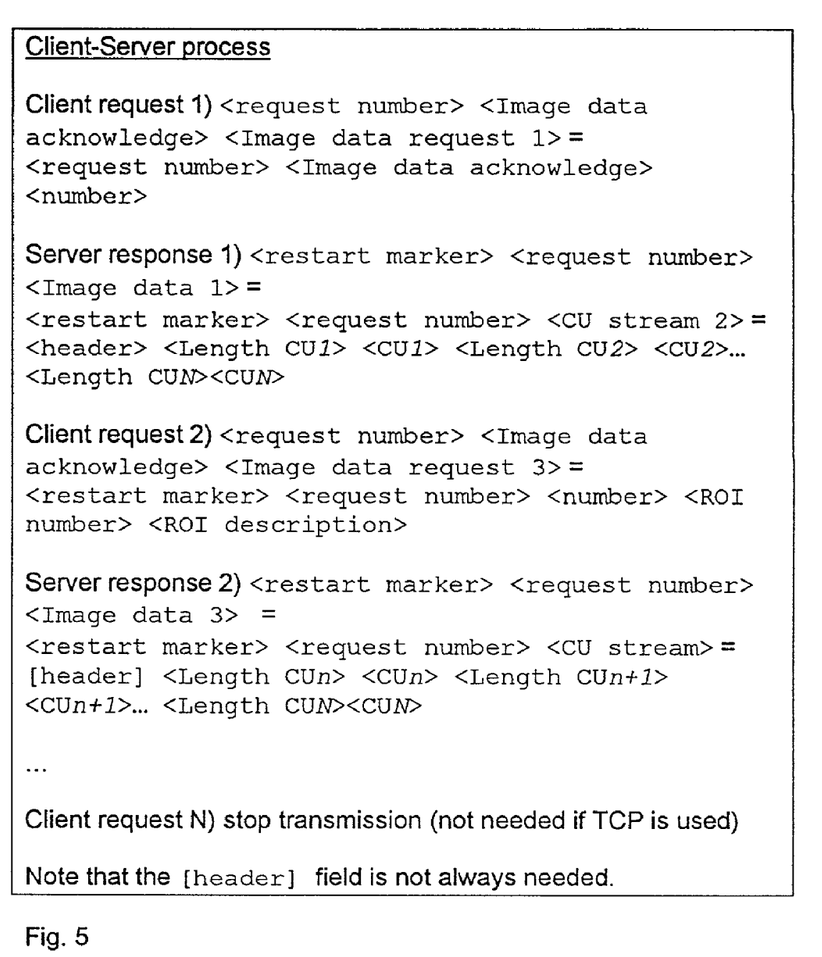
FIG. 5 shows the steps carried out in a client-server process according to a first alternative of the third embodiment.

The resulting Client-Server process is shown in FIG. 5. This will result in that there is no need to re-send the array of CU lengths as shown in FIG. 4.

It is also possible to use TAGS or re-sync marks in the bit stream. Thus instead of having an array describing the length of each CU above in conjunction with FIG. 4, the CU can be marked out in the bit stream by a bit pattern that is not generated by the entropy coder. The bit stream is searched in a sequential manner in order to find the different coding units.

Figure 6:
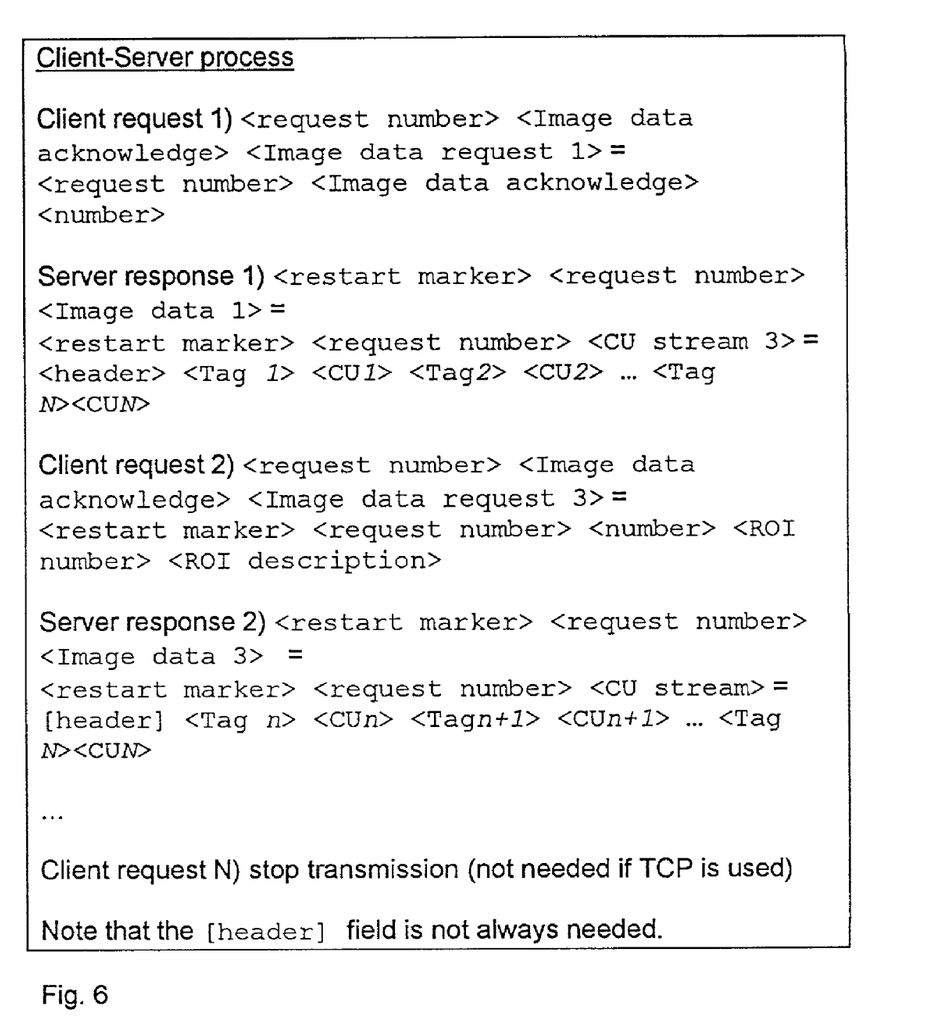
FIG. 6 shows the steps carried out in a client-server process according to a second alternative of the third embodiment.

The interaction between the Client and the Server and the operation at each sides is changed so that instead of sending a re-start mark and the lengths of the CU's to be sent and starts the transmission of the CU's, the Server can send a re-start mark and a TAG before the corresponding CU. The resulting Client-Server process is shown in FIG. 6.

Figure 7:
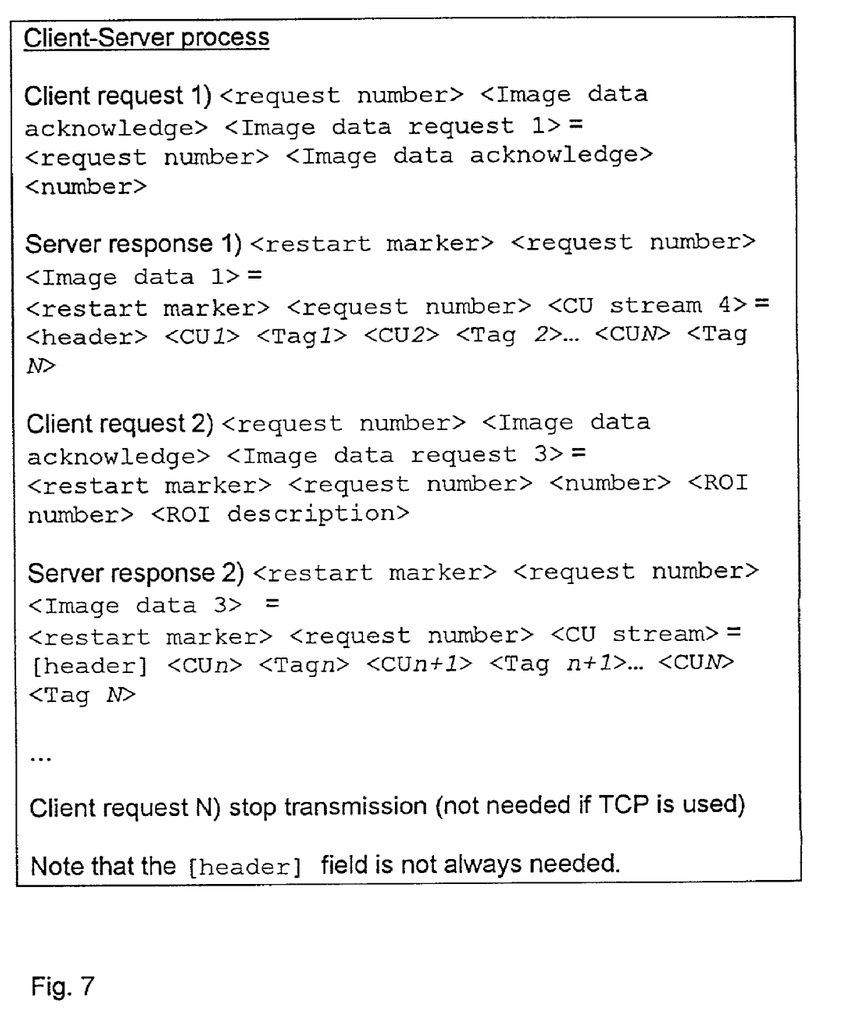
FIG. 7 shows the steps carried out in a client-server process according to a third alternative of the third embodiment.

It should be noted that an alternative way is to use send the TAGS after each CU or header instead of before the CU as is shown in FIG. 7. Thus, the interaction between the Client and the Server and the operation at each sides is changed so that instead of sending a re-start mark and the lengths of the CU's to be sent and starts the transmission of the CU's, the Server sends a re-start mark and a TAG after the corresponding CU.

Another solution could be to use the "scaling based method" in JPEG2000 for the rest of the subbands. This means that the ROI mask for the remaining subbands still is produced, but no different encoding of the ROI mask coefficients must be performed. The ROI mask coefficients are scaled up by a certain factor. Then encoding of the subbands will continue without changes. The shifting value must be stored in the bit stream, so the Client can shift down. Thus, the interaction between the Client and the Server and the operation at each sides is changed so that instead of sending a re-start mark and the lengths of the CU's to be sent and starts the transmission of the CU's, the Server can now send a re-start mark and a TAG after the corresponding CU.

In the schemes described above in conjunction with FIGS. 4-7, the Server needs to perform an entropy decode and then an entropy encode of the quantized coefficients. This is not so good if a really fast access of different parts of the image is desired.

Figure 8:
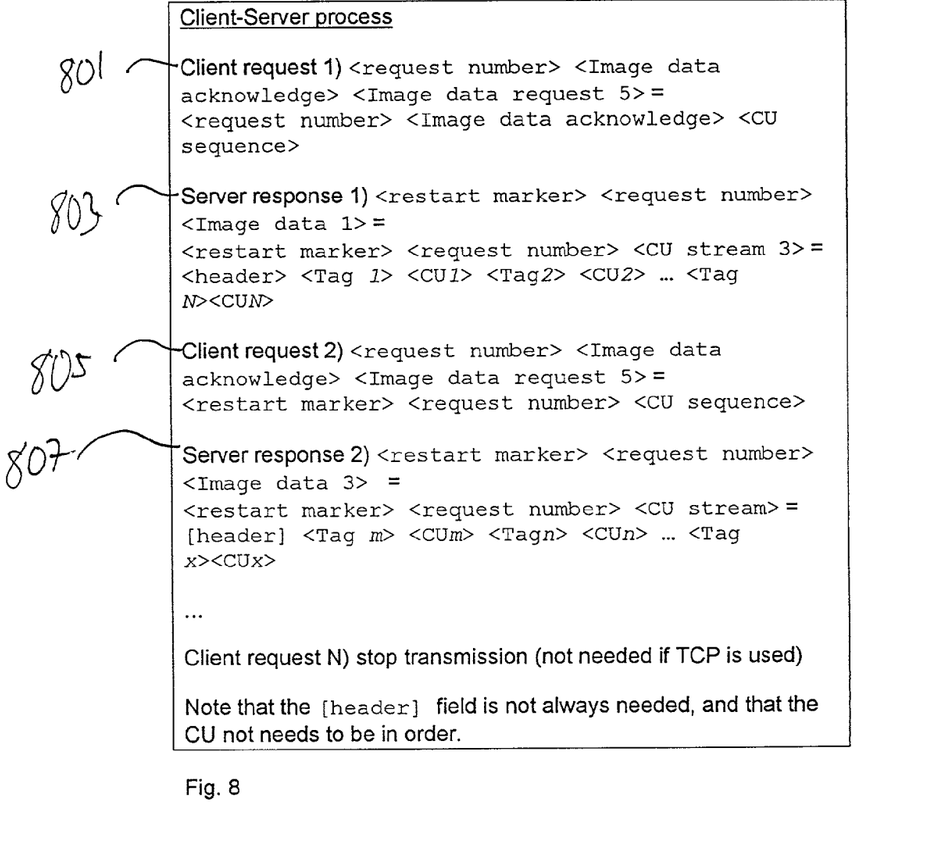
FIG. 8 shows the steps carried out in a client-server process according to a fourth embodiment.

The solution to this problem is that the image is divided into blocks that are independently decodable. These will be the CU's. The interaction between the Client and the Server and the operation at each sides are the following is shown in FIG. 8. It should be noted that acknowledgement messages and similar messages are left out.

Step 801, The client sends and requests for a stored image. The image is stored as a compressed bit stream.

Step 803, The Server responds and starts the transmission

Step 805, The Client decides that a part of the image is more important and creates a mask in the transform domain, see Ref. 1, that selects the CU's needed. The desired CU's is sent to the Server.

Step 807, The Server gets the request for the CU's. The Server may now send a re-start mark and the TAG for is before its corresponding CU.

The method and system as described herein provides a number of advantages compared with prior client-server systems for retrieving images. Thus, the Server does not need any memory to store information of what parts it has sent. In the first embodiment the server does not need to perform any processing whatsoever in order to give the client the wanted desired parts of the bit stream. The Client will get the information of where the requested parts are stored from the image header. In the first and second embodiment, the Server does not need to perform any entropy decoding, it only has to send the requested CU's. Thus, decreasing the transmission time dramatically. In the third embodiment the Server does not have to decode that whole bit stream. This will save a lot of time at the sender side (server side), since it not needs to a full decoding of the stream.

The method and system as described herein can also be extended to be used together with a video compression algorithm that have independent decodable units in the compressed video stream.

The invention claimed is:

1. A method of compressing an image at a server, storing a compressed representation of the image at the server and transmitting at least part of the compressed representation of the image from the server to at least one client, the method comprising:
   transforming the image into a frequency domain to form frequency domain coefficients;
   after said transforming, subdividing the frequency domain coefficients corresponding to the image into at least one block, each block comprising at least one transformed coefficient;
   compressing, via entropy coding, at least a first block and at least a second block into different independently decodable coding units, respectively;
   after said compressing, storing at least one of the first and second coding units on the server;
   receiving a request at said server; and
   responsive to the request, transmitting from the server to at least one client the coding unit(s) corresponding to the request so that upon receiving the request the coding unit(s) corresponding to the request are transmitted to the at least one client without the server having to employ further entropy encoding with respect thereto.

2. The method of claim 1, wherein the request describes at least one region of interest of the image, wherein the server identifies which of stored coding units contain information transformed coefficients needed to reconstruct said region of interest, and the server transmits the identified coding unit(s) needed to reconstruct the region of interest to the at least one client.

3. The method of claim 2, wherein the region of interest is defined by a mask in the transform domain.

4. The method of claim 1, wherein the request defines at least one coding unit, and the server transmits the at least one coding unit that is defined in the request to the at least one client.

5. The method of claim 1, wherein the request contains information identifying region(s) of less interest of the image that the at least one client does not want to receive.

6. The method of claim 5, wherein the region(s) of less interest is defined by a mask in the transform domain.

7. The method of claim 1, wherein the request comprises information identifying at least one coding unit that the at least one client does not want to receive.

8. The method of claim 1, wherein, in response to the request, the server only transmits coding units that have not already been transmitted to the at least one client.

9. The method of claim 1, wherein the request defines at least one coding unit, and the server only transmits in response to the request coding units that have not already been transmitted to the at least one client.

10. The method of claim 1, wherein the image is transformed into the frequency domain using at least a wavelet transform.

11. The method of claim 1, wherein the blocks are arbitrarily shaped blocks.

12. The method of claim 1, wherein the image is quantized.

13. A server apparatus performing the steps recited in claim 1.

* * * * *

UNITED STATES PATENT AND TRADEMARK OFFICE
CERTIFICATE OF CORRECTION

PATENT NO. : 7,571,382 B2  Page 1 of 1
APPLICATION NO. : 09/418323
DATED : August 4, 2009
INVENTOR(S) : Larsson et al.

It is certified that error appears in the above-identified patent and that said Letters Patent is hereby corrected as shown below:

In Column 6, Line 65, delete "Process 2" and insert -- Process C2 --, therefor.

Signed and Sealed this

Twenty-second Day of December, 2009

David J. Kappos
*Director of the United States Patent and Trademark Office*